Patented Oct. 4, 1932

1,880,528

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ACCELERATOR OF RUBBER VULCANIZATION

No Drawing.    Application filed January 10, 1928. Serial No. 245,808.

My invention relates to the treatment of rubber and rubber-like substances and it has particular relation to methods of vulcanizing these materials. The invention has for one of its objects the provision of a class of materials which, when incorporated in rubber compounds, bring about rapid vulcanization and a product having excellent aging qualities. Another object of the invention consists in the provision of a class of materials having the above enumerated characteristics, which may be readily manufactured and easily dispersed in rubber compounds.

It has been observed heretofore that certain mercaptothiazoles and their derivatives, when incorporated in vulcanizable rubber compounds, cause rapid cures and a high quality of product. This invention resides in the discovery that certain compounds of this class may be reacted with nitroso compounds, such as nitroso dimethyl aniline and nitroso naphthol, to produce compounds which are also efficient accelerators when incorporated in rubber.

To manufacture compounds of this class, a thiazole, such as mercaptobenzothiazole, is mixed with a nitroso compound, such as nitroso dimethyl aniline or nitroso naphthol, the materials then being heated to the melting point. At this temperature a vigorous reaction occurs which is permitted to continue without the application of further heat until it is completed. The resultant mass, after cooling is obtained as a hard, brittle product which may be ground to a powder. The powder may be used without further treatment or it may be treated with ammonium hydroxide in order to remove any unreacted mercaptobenzothiazole which may be contained therein.

The reactions taking place when mercaptobenzothiazole is heated with nitroso dimethyl aniline or nitroso naphthol may be represented by the following structural formulæ:

I

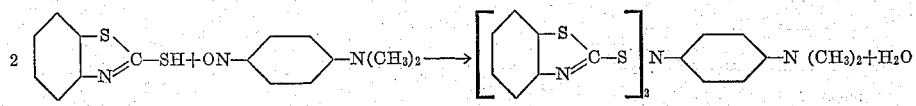

II

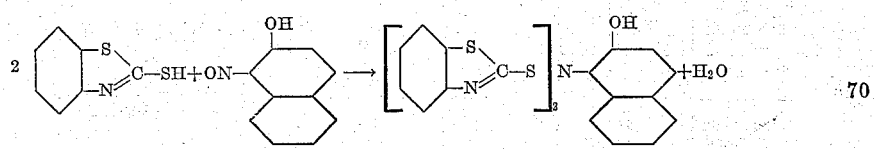

The materials prepared in accordance with the preceding method may be incorporated in most of the standard rubber stocks with satisfactory results. The following is an example of a formula which has been found by experiment to yield excellent results when either the nitroso dimethyl aniline salt or the nitroso naphthol salt of mercaptobenzothiazole is employed as an accelerator:

| | Parts |
|---|---|
| Rubber | 100 |
| Zinc oxide | 5 |
| Sulfur | 3 |
| Stearic acid | 1.5 |
| Accelerator | .5 |

Samples of material prepared in accordance with the preceding formula were subjected to vulcanization at various temperatures and for varying periods of time. These samples were then subjected to physical tests in order to ascertain their tensile strength and elasticity, both before and after an aging test which was conducted in an oxygen bomb under a pressure of 150 pounds per square inch and at a temperature of 50° C. for a period of six days. The results of these tests are contained in the appended tables.

Reaction product 2-mercaptobenzothiazole p. nitroso dimethyl aniline, ammonia extracted

| Cure | Tensile strength kgs./cm.² | Percent elong. | Load in kgs./cm.² at | | % weight increase |
|---|---|---|---|---|---|
| | | | 500% elong. | 700% elong. | |
| ORIGINAL | | | | | |
| :30 at 40# | 180 | 800 | 27 | 94 | |
| :15 at 20# | 85 | 950 | 10 | 26 | |
| :30 at 20# | 164 | 880 | 18 | 60 | |
| :45 at 20# | 201 | 850 | 24 | 87 | |
| 1:00 at 20# | 192 | 810 | 28 | 104 | |
| 2:00 at 20# | 228 | 790 | 33 | 123 | |
| AGED IN OXYGEN BOMB 6 DAYS AT 50° C. | | | | | |
| :30 at 40# | 172 | 785 | 28 | 102 | 0.39 |
| :15 at 20# | 102 | 900 | 14 | 37 | |
| :30 at 20# | 162 | 825 | 24 | 82 | 0.21 |
| :45 at 20# | 184 | 805 | 28 | 103 | 0.15 |
| 1:00 at 20# | 198 | 795 | 31 | 116 | 0.11 |
| 2:00 at 20# | 180 | 750 | 36 | 136 | 0.54 |

Reaction product 1-nitroso-naphthol 2-mercaptobenzothiazole, ammonia extracted

| Cure | Tensile strength kgs./cm.² | Percent elong. | Load in kgs./cm.² at | | % weight increase |
|---|---|---|---|---|---|
| | | | 500% elong. | 700% elong. | |
| ORIGINAL | | | | | |
| :30 at 40# | 95 | 860 | 14 | 37 | |
| :30 at 20# | 44 | 970 | 6 | 12 | |
| :45 at 20# | 92 | 950 | 11 | 25 | |
| 1:00 at 20# | 116 | 955 | 12 | 30 | |
| 2:00 at 20# | 158 | 880 | 18 | 56 | |
| AGED IN OXYGEN BOMB 6 DAYS AT 50° C. | | | | | |
| :30 at 40# | 90 | 850 | 15 | 39 | 0.38 |
| :30 at 20# | 55 | 940 | 10 | 17 | 0.14 |
| :45 at 20# | 85 | 910 | 11 | 20 | 0.20 |
| 1:00 at 20# | 100 | 890 | 14 | 27 | 0.20 |
| 2:00 at 20# | 116 | 825 | 20 | 57 | 0.54 |

It will be observed from the tables that compounds containing either of the accelerators described are well cured within a comparatively short time. However, comparatively long heating at the vulcanizing temperature does not result in excessive overcure. It will also be observed that the employment of these accelerators gives a product having excellent aging qualities.

Although I have described in detail only the preferred embodiments of the invention it will be apparent to those skilled in the art that it is not so limited, but that various minor modifications may be made therein without departing from the spirit of the invention or from the scope of the appended claims, wherein I intend to claim all features of patentable novelty inherent in the invention.

What I claim is:

1. A method of treating rubber which comprises vulcanizing it in the presence of a material having the following structural formula:

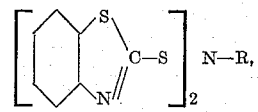

in which R represents a basic nitrogen substituted benzene radical.

2. A method of treating rubber which comprises vulcanizing it in the presence of a material having the following structural formula:

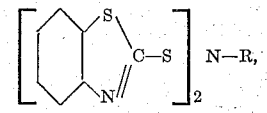

in which R represents an aniline group.

3. A method of treating rubber which comprises vulcanizing it in the presence of a material having the following structural formula:

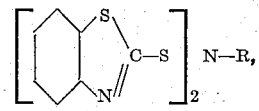

in which R represents dimethyl aniline.

4. A rubber product vulcanized in the presence of a material having the following structural formula:

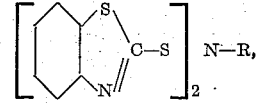

in which R represents an aniline group.

5. A rubber product vulcanized in the presence of a material having the following structural formula:

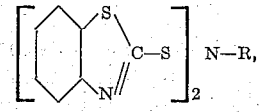

in which R represents a dimethyl aniline group.

6. A rubber product that has been vulcanized in the presence of the reaction product of a mercaptothiazole and a nitroso aniline compound.

7. A method of treating rubber which comprises vulcanizing it in the presence of the reaction product of a mercaptothiazole and a material having the following structural formula: O=NR, in which R represents an aniline group.

8. A method of treating rubber which comprises vulcanizing it in the presence of the reaction product of a mercaptothiazole and a nitroso dimethyl aniline.

9. A method of treating rubber which comprises vulcanizing it in the presence of a material having the formula

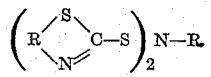

in which R, is an alkyl substituted aniline group.

10. A method of treating rubber which comprises vulcanizing it in the presence of a material having the formula

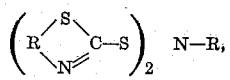

in which R, is a di-alkyl substituted aniline group.

11. A method of treating rubber which comprises vulcanizing it in the presence of a reaction product of mercaptobenzothiazole and a nitroso derivative of an alkyl substituted aniline.

12. A method of treating rubber which comprises vulcanizing it in the presence of a reaction product of mercaptobenzothiazole and a nitroso derivative of a di-alkyl substituted aniline.

In witness whereof, I have hereunto signed my name.

Signed at Akron, in the county of Summit, and State of Ohio, this 7th day of January, 1928.

JAN TEPPEMA.